Oct. 30, 1962   H. A. SPETS   3,060,615
FISHHOOK SETTING DEVICE
Filed Oct. 20, 1961
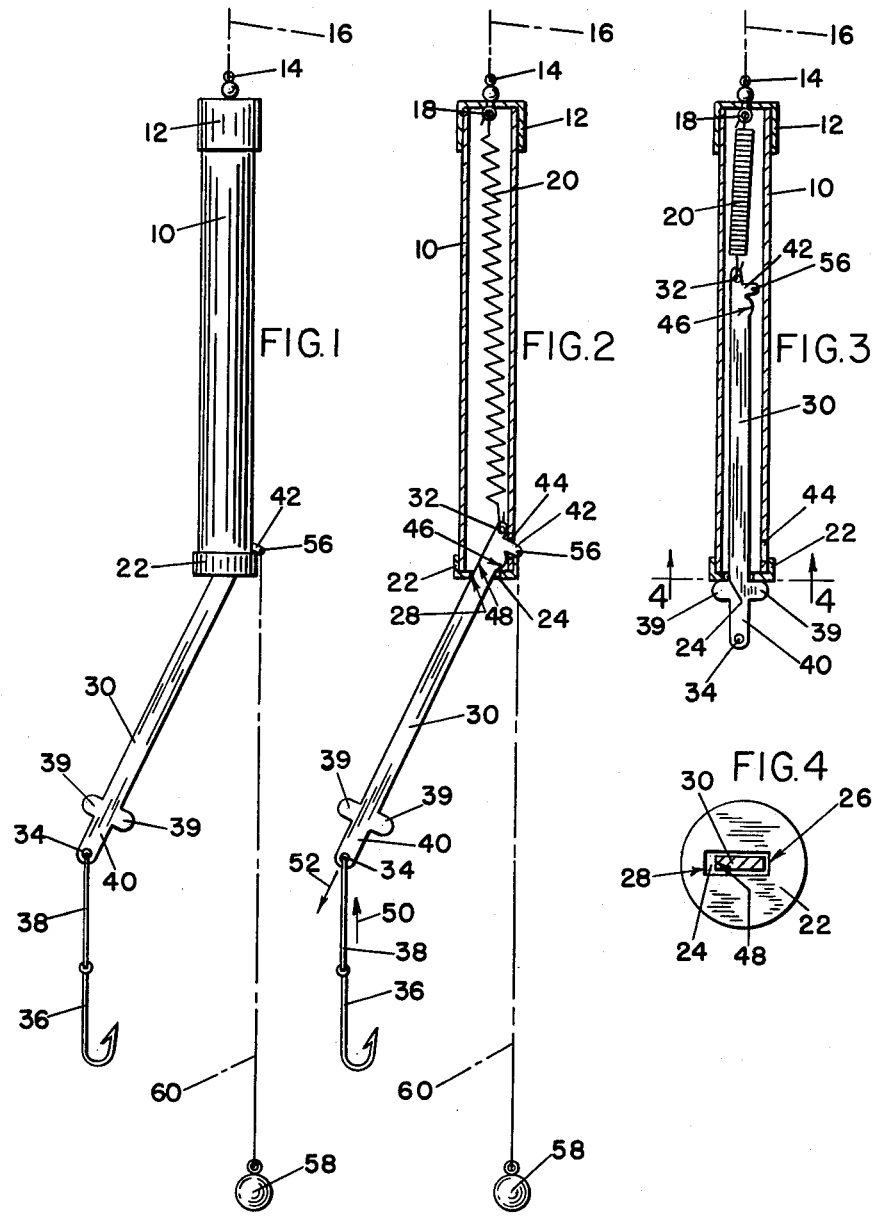
INVENTOR
HERBERT A. SPETS
by Charles R. Fay,
ATTORNEY

United States Patent Office 3,060,615
Patented Oct. 30, 1962

3,060,615
FISHHOOK SETTING DEVICE
Herbert A. Spets, 54 Old Common Road, Auburn, Mass.
Filed Oct. 20, 1961, Ser. No. 146,516
5 Claims. (Cl. 43—15)

This invention relates to a new and improved fishhook setting device and it is particularly adapted for bottom fishing where it can be suspended close to or on the bottom and including structure for the substantially instant hooking of the fish nibbling at the bait, so that the fish is much more easily hooked and many nibbling fish are caught which would otherwise escape upon attempted strike by the fisherman.

Other objects of the invention include the provision of a device as above described including an elongated tubular housing having a tension spring in it secured at one end thereto, the other end of the spring being secured to an elongated element or ram, and the ram having a projection thereon for insertion in an opening in the tubular housing adjacent the opposite end of the device from which the spring is attached, this end of the housing being provided with an opening conforming in general to the shape of the elongated element or ram, the latter having a stop for preventing complete withdrawal into the housing, so that there is always a handle portion on the ram for manual reset of the device, said projection engaging said opening, setting the device ready for fishing, and there being provided special new and improved means for very quick and easy actuation of the device on a very slight tug by the fish, so that even lightly nibbling fish are easily caught; and at the same time providing against undesired release of the device when and if the elongated ram or element should strike the bottom.

Further objects of the invention include the provision of a device of the class described including a tubular housing and an elongated element or ram which is adapted to be partially withdrawn from the housing to set a spring which is easily actuated to cause the hook to strike the fish, in combination with means including a weight or sinker for finding the bottom, leaving the hook and the bait a few inches above the bottom for greater catch, particularly of bottom feeding fish.

The invention further relates to arrangements and combinations of parts which will be hereinafter described and more particularly set forth in the appended claims.

Reference is to be had to the accompanying drawings, in which

FIG. 1 is a view in elevation illustrating the device set and located ready for fishing;

FIG. 2 is a longitudinal sectional view through the device of FIG. 1, showing the same set;

FIG. 3 is a sectional view similar to FIG. 2 showing the same in tripped condition, and FIG. 4 is an enlarged sectional view on line 4—4 of FIG. 3.

In carrying out the invention, there is provided an elongated tubular member 10 which may be of any suitable material preferably rustproof, such as copper, brass, plastic, etc. This tube is provided at one end with a cap such as at 12, this cap providing a mounting for an eye 14 to which a line 16 may be conveniently attached. The member 14 may include a swivel or the like if desired, but in any event it is firmly located in the cap as shown and provides an interior eye 18 for the attachment of one end of a coiled tension spring 20.

At the opposite end of the tube or housing 10 there is provided another cap 22 having a rectangular opening 24 therein, this opening extending from a point just above the center of the cap at 26 to a point below the center and close to the rim as at 28 for a purpose to be described. The two caps 12 and 22 may be secured to the tubing in any way desired by riveting, the use of adhesives, welding, etc.

An elongated element or ram generally indicated by the reference numeral 30 is provided to be slidably received in the opening 24, this sliding action being longitudinal with a slight inclination as shown in FIG. 2. This ram is connected at 32 to the other end of the spring and extends outwardly through the opening 24 to a minimum degree shown in FIG. 3 to a maximum degree shown in FIG. 2. At its outer end as at 34 there is means providing for connection to a fishhook such as 36 or a snell or leader 38 which is preferably rather short because the device is intended primarily for bottom fishing and it is desired that it should act as quickly as possible in order to hook the greatest number of fish. Just inwardly from the connection at 34 there are stop members 39 at both sides of the elongated element 30, and the stops 39 will be seen to prevent the spring drawing the ram completely into the housing. This leaves at all times a handle portion 40 by which means the device may be quickly and easily reset whenever desired without the operator pulling on the hook or the leader 38.

At its inner end, the ram 30 is provided with a projection 42 which extends laterally thereof in the plane of the device and this projection 42 is for the purpose of setting the ram 30 by engagement in an aperture 44 in a side wall of the housing 10 adjacent cap 22.

On the ram adjacent the projection 42 there is a fulcrum forming member which is generally indicated by the reference numeral 46. This member is in the form of a cam having a rounded surface which engages the interior of the wall of the housing 10 adjacent the opening 44 when the projection 42 is set in place in the opening. The cam fulcrum forming member 46 is located outwardly of the projection 42 and forms a bearing surface generally located within the area of cap 22 as seen in FIG. 2.

The left hand edge 48 of the elongated element or ram 30 may bear on the edge 28 of the cap 22 (see FIG. 4), to a greater or less degree, depending upon the size of this cam, and by varying the size of the cam 46 therefore, the degree of pressure required to release the device to set the hook can be varied according to the habits of different fish.

Looking at FIG. 2, if there should be pressure applied in the direction of arrow 50 as by striking the bottom, the device is not released, but a pull in any direction, as in the direction of the arrows 52, causes instant release of the projection from its opening 44 and the spring will then thereby cause instant hooking of the fish. The ram in effect, rocks on the cam, or on the rounded nose 46.

If desired, an eye 56 can be applied by which a weight or sinker 58 is attached to the housing 10 and the line 60 can be made of such a length as to position the sinker a few inches lower than the hook 36. The fisherman can use the line as a hand line if he wishes to, and he will of course be apprised when the sinker touches the bottom, and thereby the fisherman is enabled to position his hook a few inches above the bottom in the best position for hooking bottom feeding fish.

The device can be made of different kinds of materials, preferably rustproof, and it can be provided with oiling devices if such should be found desirable. In use it can be utilized with a trot line or it can be tied to a boat or to a support of any kind, but no matter how it is supported, it will operate to trip to quickly hook any kind of nibbling fish instantaneously. The device can be made of any size, depending upon the kind of fish that are to be caught, and many other variations of construction, size, weight, material, etc. can be made, depending upon the circumstances in which the fishhook setter is to be used.

Having thus described my invention and the advantages thereof, I do not wish to be limited to the details herein disclosed, otherwise than as set forth in the claims, but what I claim is:

1. A fishhook device comprising an elongated tubular housing, a tension spring in the housing, means connecting an end of the spring to the housing at one end of the housing, a rigid elongated element connected at one end thereof to the other end of the spring in the housing, said housing having an opening therein at its end opposite the said one housing end, the elongated element slidably extending through the opening and tensioning the spring when at least partially withdrawn with respect to the housing, said housing having a second opening in a wall thereof adjacent the end opening through which the elongated element projects, a projection on the elongated element adjacent its connection to the spring, said projection being adapted to extend through said second opening and to seat on an edge of the wall of the housing formed by the second opening to set the elongated element in position to hold the spring tensioned and holding the elongated element against release by pressure on the element in a direction toward the spring, means forming a rounded projecting fulcrum on the elongated element adjacent the projection, said fulcrum engaging the wall of the housing at the interior thereof adjacent said second opening for quick release of the projection and the elongated element on which the projection appears by a pull away from the spring or by a tilting motion applied to the element, and a fishhook attached to the element at its end remote from the connection of the spring thereto.

2. The device of claim 1 including a stop on the element adjacent the end thereof remote from the spring to limit the motion of the element into the housing under influence of the spring.

3. The device of claim 1 wherein the fulcrum forming means is a cam.

4. The device of claim 1 wherein the elongated element is of flat stock having less breadth than the diameter of the housing and is caused to extend at an inclination to the general axis of the housing when set, the projection and fulcrum being located on an edge of the flat stock elongated element.

5. A fishhook device comprising an elongated tubular housing, a tension spring in the housing, means connecting an end of the spring to one end of the housing, a rigid elongated element connected at one end thereof to the other end of the spring in the housing, said housing having an opening therein at its end opposite the said one housing end, the elongated element slidably extending through the opening and tensioning the spring when at least partially withdrawn with respect to the housing, said housing having a second opening in a wall thereof adjacent the end opening through which the elongated element projects, a projection on the elongated element adjacent its connection to the spring, said projection being adapted to extend through said second opening and to seat on an edge of the wall of the housing formed by the second opening to set the elongated element in position to hold the spring tensioned and holding the elongated element against release by pressure on the element in a direction toward the spring, cam means on said elongated element providing quick release of the projection and the elongated element on which the projection appears by a pull away from the spring or by a tilting motion applied to the element which causes the cam means to engage the interior wall of the housing and to move the projection out of said second opening, a fishhook attached to the element at its end remote from the connection of the spring thereto, and a stop on the element adjacent the said remote end, said stop preventing the element from fully entering the housing and leaving an exposed portion to be manually grasped to reset the element.

References Cited in the file of this patent
UNITED STATES PATENTS

| | | |
|---|---|---|
| 2,560,875 | Knott | July 17, 1951 |
| 2,801,487 | Morgan | Aug. 6, 1957 |